H. S. MYERS.
EXTENSION CLUTCH CONTROL.
APPLICATION FILED FEB. 15, 1922.
1,418,265. Patented May 30, 1922.
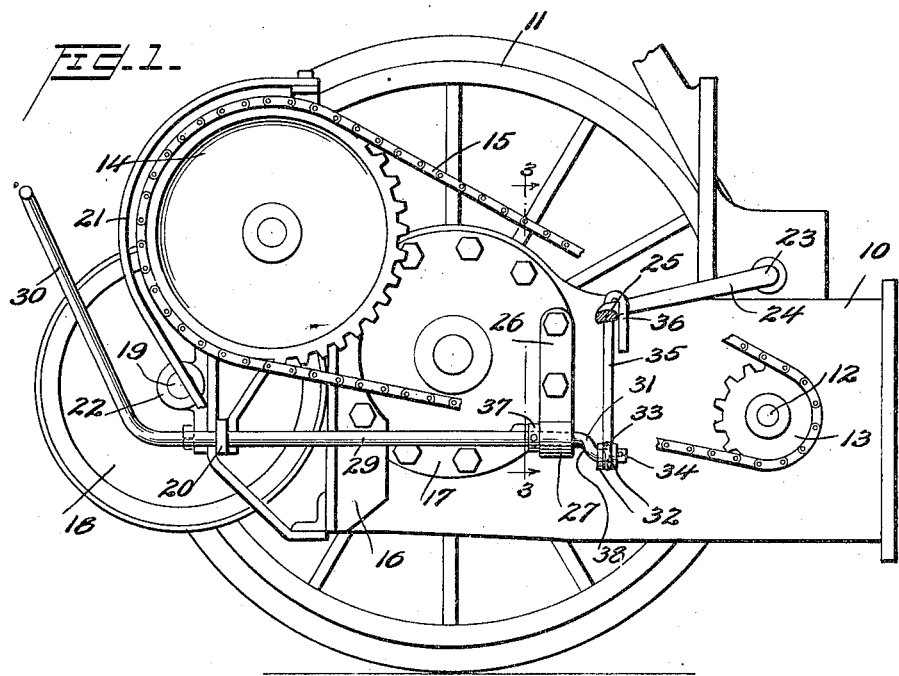
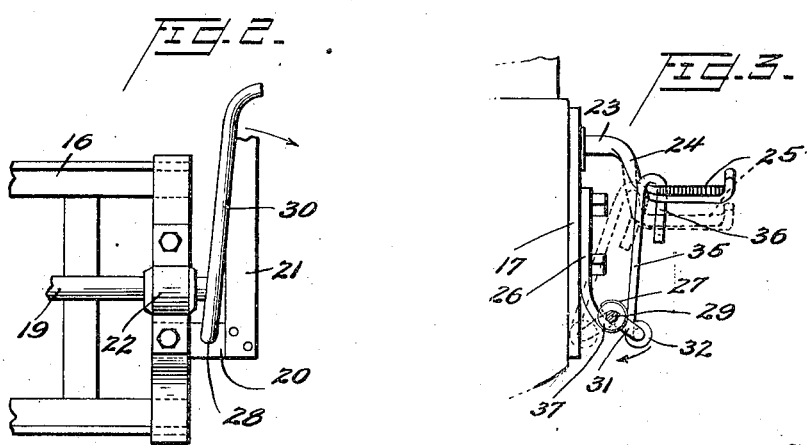
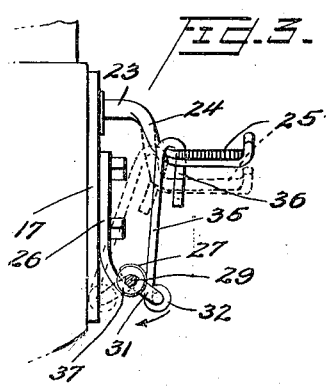
Inventor
Harry S. Myers
By Wm. D. Shoemaker
Attorney

UNITED STATES PATENT OFFICE.

HARRY S. MYERS, OF VAN, PENNSYLVANIA.

EXTENSION CLUTCH CONTROL.

1,418,265. Specification of Letters Patent. Patented May 30, 1922.

Application filed February 15, 1922. Serial No. 536,747.

*To all whom it may concern:*

Be it known that I, HARRY S. MYERS, a citizen of the United States, residing at Van, in the county of Venango and State of Pennsylvania, have invented certain new and useful Improvements in Extension Clutch Controls, of which the following is a specification.

This invention relates to an extension clutch control for motor vehicles, and more particularly to a lever and connections by means of which the clutch pedal of a Fordson tractor may be depressed by an operative standing at a point in rear of the tractor.

Standard forms of tractors are quite generally equipped with a power shaft extending from the transmission mechanism to a point outside of the tractor body, which shaft is equipped with a belt pulley adapted to drive machinery of different kinds. The driven machinery may be located either to the front of or to the rear of the tractor, and it is desirable to have the control means for the clutch pedal extend to a point where an operative on the ground can readily depress the pedal and stop the rotation of the belt pulley to cut off the power from the piece of machinery.

While my invention may be employed with a variety of forms of tractors and machinery driven thereby, I have chosen for the purpose of illustration its use in connection with a hoisting attachment upon the rear of a tractor of the Fordson type.

The object of my invention is the provision of an extension control for a clutch pedal for a tractor that the power of the belt pulley may be cut off from a point other than the driver's seat. A further object is the provision of such control extending to the rear of a tractor and mounted in suitable bearings provided upon the tractor and its associated parts. A further object of the invention is the provision of means whereby the clutch pedal may be depressed and held down indefinitely without the attendant's attention. A further object is the provision in such an extension control of a connection between the control elements and the clutch pedal, which will permit the pedal to be depressed without disturbing the parts of the control mechanism.

Other objects and advantages of the invention will hereinafter appear in the following description and the novel features thereof will be particularly pointed out in the appended claims.

Like reference numerals indicate like parts throughout the several figures of the drawings, in which—

Figure 1 is a side elevation of a tractor rear end with a wheel removed showing my extension clutch control mounted upon the tractor in connection with a hoisting attachment, Figure 2 is a rear elevation of a small section of the hoisting attachment showing the rear bearing for the control lever, and Figure 3 is a section taken on the line 3—3 of Figure 1 showing the connection between the extension clutch control and the pedal and the means whereby the pedal may be held down indefinitely without attention upon the part of the operative.

It will be understood that the principles of my invention may be embodied in a variety of forms, and that the present embodiment is merely indicative. It is, however, one which has been found practical in construction and operation.

In Figure 1 is shown in elevation the rear portion of a Fordson tractor 10 with one of the tractive wheels 11 removed. Such a tractor is equipped with a power shaft 12 on which is shown mounted a sprocket pinion 13 driving a sprocket gear 14 through the medium of a chain 15.

The gear 14 constitutes the main driving element of the hoisting attachment, which comprises a frame 16 shown herein as mounted upon the differential housing 17 of the tractor. The numeral 18 indicates an end of a hoisting drum mounted upon a shaft 19 (see Figure 2). From the frame 16 there extends a short connecting member 20 supporting one end of a guard 21. This connector is firmly secured by a bolt which is used to mount the bearing 22 on the frame.

The clutch pedal 23 comprises a lever 24 extending to the rear and downwardly and provided with a foot rest 25, the whole designed to be depressed by the foot of an operative of the tractor when driving the same from his position upon the seat. Upon a depression of this pedal the clutch is released and the power cut off from the shaft 12.

On the forward portion of the differential housing 17, I have mounted a strap 26 slightly bent outwardly at its lower end and terminating in a bearing eye 27. In the connector 20 I have provided a bearing aperture 28.

Through the bearing eye 27 and the bearing aperture 28 there passes a lever 29 provided at its rear end with a hand portion 30 bent rearwardly and upwardly, occupying the position shown in Figures 1 and 2 while the clutch pedal is lifted as shown. At the opposite end of this lever forward of the eye 27, it is bent to form the crank end 31 upon which is mounted washers 32, 32, spacing an eye 33, all of which parts are held upon the crank end by a pin 34.

The eye 33 is the lower end of a link 35, which is bent back upon itself to form a hook 36 which engages over the arm 24 of the clutch pedal.

A limited amount of lateral movement of the lever 29 in its bearings may not be disadvantageous, but in order to control the amount thereof, I have provided a collar 37 held by a set screw upon the lever at one side of the bearing eye 27, and it will be appreciated that the face 38 of the crank end lying to the opposite side of the bearing eye 27 will with the collar define the limits of lateral movement of the lever. Or this collar may be omitted and the hand end 30 of the lever bent close to the bearing aperture 28 to define the limit in one direction.

The operation of the extension clutch control should be clear from the foregoing description. An operator standing at the rear of the tractor, when it is desired to cut off the power derived from the shaft 12, pushes the handle portion 30 in the direction of the arrow of Figure 2, which causes the crank to be turned in the direction of the arrow of Figure 3 carrying with it through the link 35 the pedal controlling the clutch of the tractor transmission mechanism. It will be understood that if the crank is thrown over to the limit of its movement, as shown by the dotted line position of Figure 3, it will not return under the influence of the clutch spring, as it has passed its dead center and the spring will only tend to maintain it there. In this position of the parts the crank end 31 will lie against the body of the tractor and the clutch will be held indefinitely in that position. To aid in the securing of this relationship of parts, the lower end of the strap 26 has been bent slightly away from the tractor body, as heretofore explained.

It will also be appreciated that the hook 36 is of such size and configuration that the clutch pedal might be depressed by the foot of a driver of the tractor without carrying with it the crank end 31 or disengaging the hook from the pedal. There is also a slight freedom of movement of the eye 33 upon the crank end which assists in attaining these desirable results.

In making and assembling my extension clutch control, the crank end 31 is first formed at one end of a straight rod and the hook 35 mounted thereon. The straight end of the rod is then passed through the eye 27 and the collar 37 (if one is to be used), after which the handle end of the lever is shaped by bending at the proper points.

In attaching the lever to the machine, the handle end is first passed through the bearing eye 28, the bends therein being upon such an angle to enable this to be readily done; the strap 26 is then attached to the differential housing by removing the necessary bolts and substituting longer ones which pass through apertures in the strap and into the housing. To attach the hook to the pedal it is necessary to both depress the pedal 23 to the limit and to throw the crank end to the limit of its upward movement by manipulating the handle end in the direction to that of the arrow in Figure 2. The hook may then be slipped over the arm 24 of the pedal.

Having described my invention, what I claim as new and desire to secure by Letters Patent is:

1. The combination with a tractor having an automotive organization comprising a motor, propelling wheels, and mechanism for transmitting power from motor to the wheels including a clutch, of a machine separate from the said tractor, transmission mechanism under the control of said clutch for driving said separate machine from the motor of the tractor, and means for controlling the movements of said clutch from a point near said separate machine.

2. The combination with a tractor having an automotive organization and a shaft for supplying power from said tractor, of a separate machine mounted upon said tractor and adapted to be driven from said power shaft, and means for controlling the power shaft comprising the tractor clutch and an extension control for said clutch extending to a point within easy reach of the operative of said separate machine.

3. The combination with a tractor having an automotive organization and a shaft for supplying power from said tractor, of a separate machine mounted upon the rear of the tractor body and adapted to be driven from said power shaft, and means for controlling the power shaft comprising the tractor clutch and an extension control for said clutch mounted in bearings upon said tractor and said separate machine and extending rearwardly to said separate machine, whereby an operative standing at the rear of the tractor may control the movements of the separate machine.

4. An extension control for tractor clutches comprising a rod mounted in bearings carried by the tractor, a crank at one end of said rod, a connection between said crank and the tractor clutch pedal, and a handle portion at the opposite end of said rod.

5. An extension clutch control for tractors comprising a rod, a crank formed at one end of said rod, bearings upon said tractor for mounting said rod close to the body of said tractor, whereby said crank end may rest against said body, a handle portion at the opposite end of said rod, and a connection between said crank end and the clutch pedal of said tractor, whereby upon the manipulation of said crank the clutch pedal will be depressed and upon a continued movement of the crank the clutch pedal will be held depressed.

6. An extension clutch control for tractor clutches comprising a bearing strap attached to the differential housing of the tractor and an aligned bearing at the rear of the tractor, a rod passing through said bearings, a crank formed upon the rod at one side of said strap bearing, a collar upon said rod at the opposite side of said strap bearing, a hook mounted upon said crank and adapted to engage the tractor clutch pedal, and a handle upon the opposite end of said rod.

In testimony whereof I affix my signature.

HARRY S. MYERS.